United States Patent [19]

Davis et al.

[11] 3,831,195

[45] Aug. 20, 1974

[54] MULTI-MODE CLOCK RECOVERY CIRCUIT FOR SELF-CLOCKING ENCODED DATA

[75] Inventors: Martin F. Davis, Thousand Oaks; Francis J. Schwanauer, Agoura; Gary J. Walker, Thousand Oaks, all of Calif.

[73] Assignee: Burroughs Corporation, Detroit, Mich.

[22] Filed: July 27, 1973

[21] Appl. No.: 383,334

[52] U.S. Cl. .................................................. 360/51
[51] Int. Cl. .................................................. G11b 5/44
[58] Field of Search...340/174.1 A, 174.1 B, 174.1 H; 331/17

[56] References Cited

UNITED STATES PATENTS

| | | | |
|---|---|---|---|
| 3,488,452 | 1/1970 | Gunning et al. | 340/174.1 B |
| 3,653,009 | 3/1972 | Krause | 340/174.1 B |
| 3,689,903 | 9/1972 | Agrawala | 340/174.1 B |
| 3,731,220 | 5/1973 | Besenfelder | 340/174.1 B |

*Primary Examiner*—Vincent P. Canney
*Attorney, Agent, or Firm*—Albin H. Gess; Benjamin F. Spencer; Edward G. Fiorito

[57] ABSTRACT

When self-clocking encoded data such as modified frequency modulated (MFM) data is read from a rotating storage medium, a clock signal must be reconstituted from the received encoded data for the subsequent decoding process. A two-mode phase-lock loop that is slaved to the rotational speed variations of the storage medium provides a wide frequency capture range and fast lock-on, initially, and high noise immunity after lock-on.

6 Claims, 2 Drawing Figures

MULTI-MODE CLOCK RECOVERY CIRCUIT FOR SELF-CLOCKING ENCODED DATA

BACKGROUND OF THE INVENTION

The present invention relates generally to improvements in clock generating circuitry and more particularly pertains to new and improved clock recovery circuits for self-clocking encoded data wherein the self-clocking encoded data is recorded on a rotating storage medium.

The use of phase-lock loop circuits for the purpose of recovering the clock signal from self-clocking encoded data is well known in the prior art. All phase-lock loops are basically composed of the following four building blocks, a phase detector, a filter, an amplifier, and a voltage controlled oscillator. These building blocks may be used in several different types of phase-lock loops. Two types of phase-lock loops are the type I, and the type II. The type I phase-lock loop is characterized as having a zero steady-state error with a constant input and some steady-state error with a ramp input. In other words, if a type I phase-lock loop were used in clock recovery application, it would have a steady-state phase error that is proportional to the frequency difference between the input data pulses and the nominal frequency of the voltage controlled oscillator. If the frequency of the two were the same, the system would be in phase and frequency locked with a steady phase difference. The type II phase-lock loop is characterized as having zero steady-state error with a ramp input.

The general procedure for retrieving self-clocking encoded binary data from a rotating storage medium comprises the reconstituting of a clock signal from the recovered encoded data pattern and using this clock signal to decode the encoded data pattern into another form of binary information. Generally, because of drive speed variations in the rotating storage medium, the retrieved encoded data may vary from the nominal frequency (the frequency at which the data was recorded) by, the percentage of drive speed variation. The phase-lock loop which is to reconstitute the clock signal from this data must, therefore, have a frequency capture range that is greater than this variation. In addition, the phase-lock loop must lock on to the retrieved encoded data; in other words, start generating clock signals that are in synchronism with the retrieved encoded data within a very short interval of time, for example, 15 micro seconds. To achieve these design criteria, that is, a wide frequency capture range and a fast lock-on time, the phase-lock loop must have a wide band width and high gain. This wide band width requirement, however, is a major failing because it renders a loop extremely sensitive to noise, causing jitter in the reconstituted clock signals, which will not permit accurate decoding of the recovered encoded data.

If a phase-lock loop having a smaller band-width were utilized, the phase-lock loop would not be so susceptible to noise and, therefore, the reconstituted clock signal would not exhibit jitter. In this case, however, the lock-on time is increased considerably; and most likely, the phase-lock loop would be unable to lock on to the recovered encoded data.

SUMMARY OF INVENTION

It is an object of this invention to provide an improved clock recovery circuit for self-clocking encoded data read from a rotating store.

Another object of this invention is to provide an improved clock recovery circuit for self-clocking encoded data that initially has a wide frequency capture range and fast lock-on, and subsequent to lock-on, has high noise immunity.

These objects and the general purpose of this invention are accomplished by utilizing a phase-lock loop circuit that has a filter therein which is switched from a first to a second mode. In the first mode, the filter causes the phase-lock loop to act as a type I phase-lock loop, which is designed to have a wide frequency window and high gain. In the second mode the filter causes the phase-lock loop to act as a type II phase-lock loop which is designed to have a narrow frequency window. A signal that indicates the rotational speed of the rotating store is present during both modes of operation of the phase-lock loop. This signal provides a correction factor to the generated clock in the amount of the rotational speed variation of the store during the first mode of operation.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof, and wherein.

DESCRIPTION OF THE PREFERRED EMBODIMENTS

Figures 1, 2:
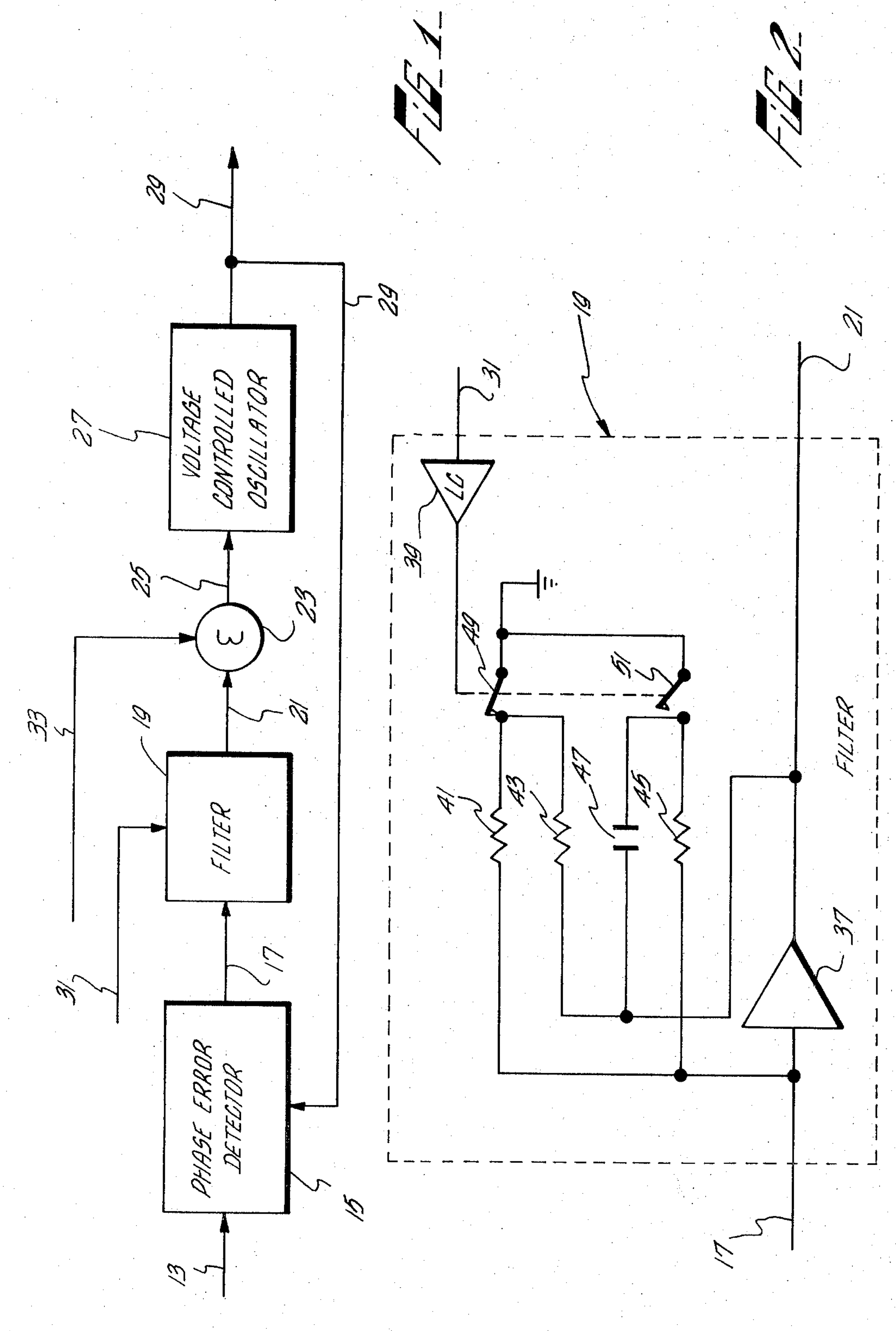
FIG. 1 is a block diagram illustration of the preferred embodiment of the invention.
FIG. 2 is a schematic illustration of a preferred embodiment of one of the elements of FIG. 1.

Referring first to FIG. 1, a phase-error detector 15 receives self-clocking binary encoded data on line 13 and the output signals from a voltage controlled oscillator 27 on line 29. The phase-error detector 15 responds to these two inputs and generates a proportional phase error indication that is supplied to a filter network 19 over line 17. In addition to this phase-error signal, the filter network 19 receives a signal over line 31 which, as will be described below, changes its characteristics. The ouput, on line 21, of this filter network is summed with a speed indicating signal, such as the output of a tachometer (not shown), received on line 33, in a manner that is well known in the art and indicated generally as the summing point 23, in the figure. The combined signal, on line 25, is thus supplied to the voltage controlled oscillator 27 to regulate the phase of the clock pulses being generated by the voltage controlled oscillator 27 on line 29.

The phase-error detector 15 may be of the type fully described and claimed in a copending application which is assigned to the same assignee as this application and having U.S. Ser. No. 302,914, filed Nov. 1, 1972. The voltage controlled oscillator 27 of FIG. 1 may be any well known voltage controlled oscillator, examples of which are in the art, such as U.S. Pat. No. 3,577,132 entitled "Phase Locked Oscillator for Storage Apparatus."

Referring now to FIG. 2, the phase-error signal from phase-error detector 15 is supplied to the filter network 19 over line 17 where it is operated on by an operational amplifier 37 and its associated network consisting of resistors 41, 43, 45 and a capacitor 47, the resulting signal therefrom being supplied to the summing circuit 23 (FIG. 1) over line 21. A level converting amplifier 39 receives binary 1 or 0 signals on line 31 from timing circuitry (not shown). In response to a level 1 for example, the level converting amplifier 39 generates a voltage that will open switch 49 and close switch 51, switches 49 and 51 preferably being electronic transistor switches that have very rapid response times.

The present invention would function in the following manner to generate a synchronzied series of clock pulses on line 29 upon the reception of self-clocking encoded data on line 13. At the instant a read cycle is instituted, the switches 49 and 51 in filter 19 would be in their normal or home positions, switch 49 being open, switch 51 being closed, since level converter amplifier 39 would not be receiving a binary 1 signal over line 31. With the switches in this position, the feedback loop around the operational amplifier 37 is such that this invention behaves like a type I phase-lock loop, but exhibits the characteristics of a relatively wide frequency window and high gain. Because of the speed indicating signal on line 33, from a tachometer or other similar source, being summed with the output signal from the filter 19 to produce a voltage for controlling the phase of the clock pulses being generated by the voltage controlled oscillator 27, the frequency window and gain required for the voltage controlled oscillator to lock-on to the incoming self-clocking encoded data is much less than it would be without such a speed indicating signal. This mode of operation provides a very fast lock-on time, for example, less than 15 micro seconds and initializes the voltage on the capacitor 47.

A timing circuit that would be well within the purview of persons of ordinary skill in the art, could, within 15 micro seconds of receiving the first encoded data synchronizing bits on line 13, generate a binary 1 level to be supplied to the level converter amplifier 39 over line 31. In response, the level converter amplifier 39 would generate a voltage level causing switch 49 to close and switch 51 to open. This position of the switches changes the feedback path around th operational amplifier 37 to a resistance-capacitance type, thereby causing the circuitry of this invention to function as a type II phase-lock loop. In other words, the circuitry would exhibit the characteristic of a narrow frequency window and zero steady state error for a ramp input.

It should be understood that the component values of the circuitry in the filter 19 and the rest of the circuitry of this invention are chosen in a manner that is well within the purview of a person of ordinary skill in the art to provide operation in the type I mode that brings the phase-error on line 17 within the band-width of the type II mode of operation within a substantial margin of time before the invention is switched into the second mode. In this second mode of operation, then, the output of the voltage controlled oscillator 27, on line 29, is a series of clock pulses that are synchronized with the incoming self-clocking encoded data on line 13. The clock pulses do not exhibit the adverse effects of jitter since the circuitry is designed to have a narrow frequency window. Since it is a type II phase-lock loop, the tachometer signal on line 33 has no effect on its operation. The clock pulses on line 29 may then be utilized to decode the self-clocking encoded date retrieved from a rotating storage medium by a decoding circuit such as is fully described in U.S. Pat. application No. 302,915 for "Method and Apparatus for Coded Binary Data Retrieval," filed Nov. 1, 1972 and assigned to the same assignee as this application.

As can be seen from the above description of the preferred embodiments, the invention provides, an improved clock recovery circuit for self-clocking decoded data that initially has a wide frequency capture range, fast lock-on, and subsequent to lock-on, has a high noise immunity.

What is claimed is:

1. A clock recovery circuit for recovering the clock signal from self-clocking encoded data read from a rotating storage medium, comprising:

means for generating clock pulses at a predetermined frequency, the phase of said frequency being dependent on an input control voltage;

means responsive to said self-clocking encoded data and the clock pulses from said clock pulse generating means for generating a signal indicative of the phase error between the frequency of the encoded data and the clock pulses;

means for operating on the phase error indicating signal from the phase error signal generating means to provide the control voltage to said clock generating means, said operating means being responsive to a first command to initially provide high gain and a wide frequency window for the phase error signal and to a second command to provide a narrower frequency window for the phase error signal.

2. The clock recovery circuit of claim 1 wherein said operating means comprises:

an operational amplifier;

a resistance feedback path around said operational amplifier;

a resistance-capacitance feedback path around said operational amplifier; and means for switching said resistance path in and said resistance-capacitance path out, or vice versa, in response to a command signal.

3. A clock recovery circuit for recovering the clock signal from self-clocking encoded data read from a rotating storage medium, comprising:

means for generating clock pulses at a predetermined frequency, the phase of said frequency being dependent on an input control voltage;

means responsive to said self-clocking encoded data and the clock pulses from said clock pulse generating means for generating a signal indicative of the phase error between the frequency of the encoded data and the clock pulses;

means for operating on the phase error indicating signal from the phase error signal generating means to provide an error voltage, said operating means being responsive to a first command to initially provide high gain and a wide frequency window for the phase error signal and to a second command to provide a narrower frequency window for the phase error signal; and means for summing the error voltage from said operating means with a rotating store speed indicating voltage to provide the control voltage for said clock generating means.

4. The clock recovering circuit of claim 3 wherein said operating means comprises:

an operational amplifier;

a resistance feedback path around said operational amplifier;

a resistance-capacitance feedback path around said operational amplifier; and means for switching said resistance path in and said resistance-capacitance path out, or vice versa, in response to a command signal.

5. The clock recovery circuit of claim 4 wherein said means for generating clock pulses comprises a voltage controlled oscillator.

6. The clock recovery circuit of claim 4 wherein said means for generating a phase error signal comprises a digital phase error detector.

* * * * *